Patented Jan. 29, 1952

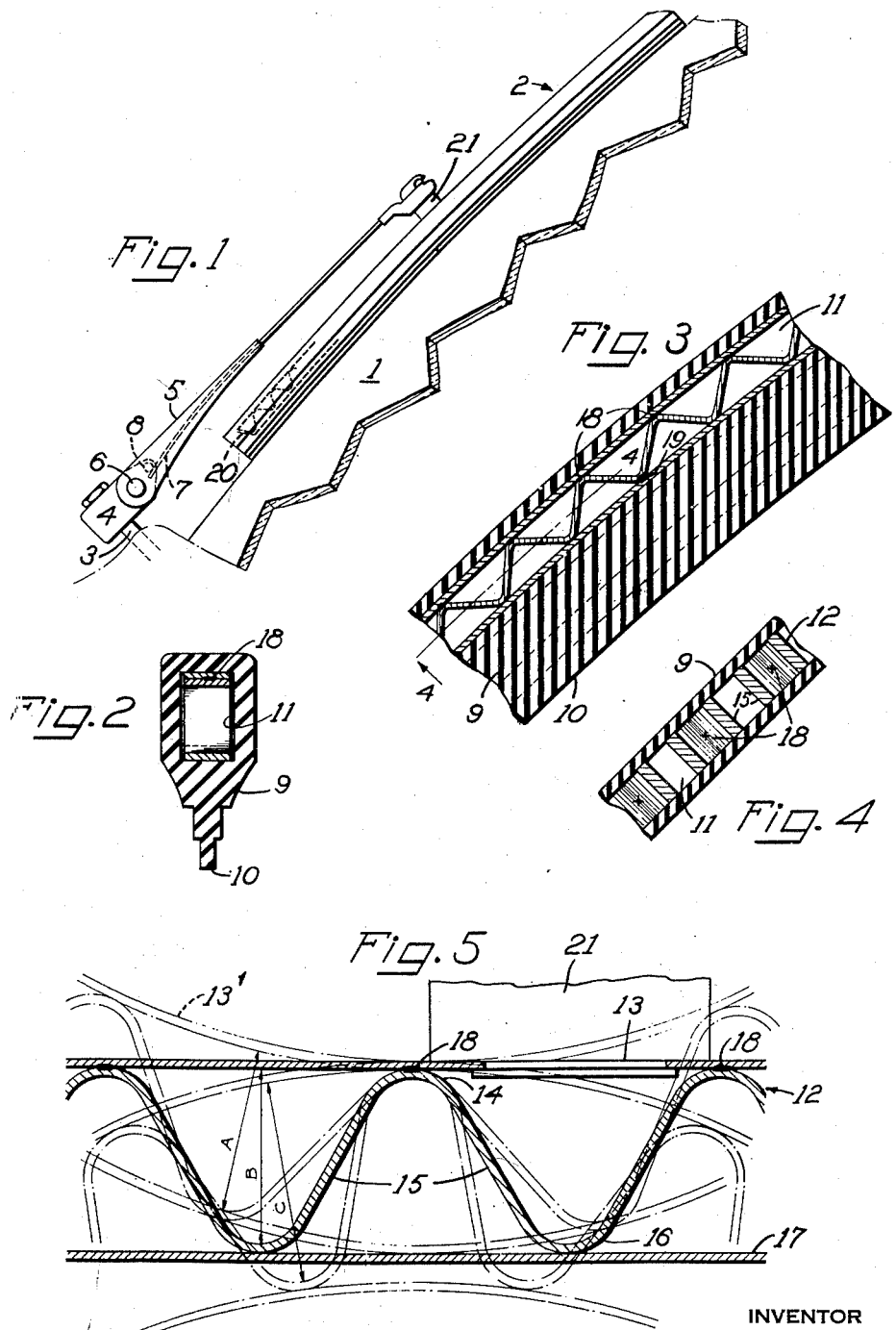

2,583,710

UNITED STATES PATENT OFFICE 2,583,710

WIPER BLADE FOR CURVED WINDSHIELDS AND OTHER SURFACES

Anthony C. Scinta, Buffalo, N. Y., assignor to Trico Products Corporation, Buffalo, N. Y.

Application December 22, 1945, Serial No. 636,549

8 Claims. (Cl. 15—250)

This invention relates to the windshield cleaning art and particularly to a wiping blade which is especially adapted for the cleaning of curved windshield surfaces.

It has heretofore been proposed to conform the wiping edge of the cleaning blade or wiper to a curved surface by means of a backing spring. The backing spring, being supported intermediate its ends by the wiper carrying arm would have its end portions subjected to a torque which resulted in an imperfect wiping of the surface where the twisting action occurred.

The object of the present invention is to provide a wiper blade for curved windshields which is highly efficient for maintaining a clear field of vision throughout the wiper stroke over such curved surface. Again, the invention has for its aim to construct a wiper blade with a sensitive resilient backing which is practically free from deformation under the torque induced by the stroking of the blade back and forth across the glass.

In the drawing which depicts one form of the invention:

Fig. 1 is a side elevation of the improved wiper showing its application to the curved surface of the windshield;

Fig. 2 is a transverse section through the improved blade;

Fig. 3 is a fragmentary longitudinal section through the wiping blade;

Fig. 4 is a longitudinal cross section through a fragment of the blade about on line 4—4 of Fig. 3; and Fig. 5 is an enlarged diagrammatic view of the resilient backing or frame which is incorporated in the finished product.

Referring more particularly to the drawing, the numeral 1 designates a curved windshield over which the improved wiper 2 is designated to be oscillated by means of an actuating shaft 3 to which it is connected by the articulated wiper arm that has an inner section 4 fixed to the shaft and an outer section 5 connected to the inner section by a pivot 6. A flat spring 7 on the outer section bears upon a shoulder 8 on the inner section to urge the wiper against the windshield with the desired wiping pressure.

The wiper or blade comprises a body 9, preferably of rubber, having a wiping edge 10 and a chamber 11 extending lengthwise through the body to impart a tubular characteristic thereto. The chamber may open through the ends of the body, and within the chamber is disposed a spring backing frame or member for distributing the pressure from the flat spring 7 throughout the length of the wiping edge 10. This pressure distributing spring backing, according to the present disclosure, comprises a spring leaf 12 corrugated throughout to impart to the same a serpentine or undulatory form. A second spring leaf 13 is secured to the crest portions 14 of the undulatory spring leaf 12 at one side of the latter for tying such portions together and providing a framework which will yield toward and from the windshield surface readily while being resistant to any torque which may be set up or developed when the wiper blade is in motion across the windshield surface. This resistant action results from the novel fabrication of the framework which in effect provides transversely opening tubes as defined by the two leaves. The individual tubes will deform somewhat according to the deflection of the framework toward or from the windshield, such deformation being diagrammatically illustrated in Fig. 5 by the dimension lines A, B and C, the loops 15 decreasing in extent from the tie leaf 13 as the latter flexes upwardly toward the dot and dash position 13'. At this same time the sides of the loops spread further apart against the inherent resiliency of the spring leaf 12, the opposite crest portions 16 being free and unconnected although slidably bearing upon a spring leaf or strip 17 for the better distribution of the wiping pressure along the wiping edge. The framework or backing, as provided by the longitudinal strips 13 and 17 and the interposed cushioning loops 15 forming cross members, afford a resilient support for the wiping edge which enables a firm wiping contact with the windshield surface.

The tie leaf or strip 13 may be spot welded at 18 to the crest portions 14 to give rigidness to the frame against twisting. The bearing strip 17 may either be spot welded to one of the crest portions 16, as indicated at 19, or have its extremities turned upwardly, as indicated at 20 in Fig. 1, or both, to hold it from longitudinal displacement. Accidental displacement of the pressure distributing spring backing from the chamber 11 is prevented by suitable means, such as by having the blade attaching clip 21 connected through the rubber wiping body to the backing member within the chamber 11.

The width of the spring leaves 12, 13 and 17 may vary according to the length of the blade since the wider these strips are, the greater will be the resistance offered to the developed torque. Other changes in construction and design may be made since it is obvious that the inventive principles

What is claimed is:

1. A wiper blade for curved windshields, having an elongated body with a wiping edge extending lengthwise thereof, and a resilient truss incorporated in the body and comprising an undulating spring strip having its crest portions at one side fixedly tied together by a spring leaf while leaving the opposite crest portions free, the undulations extending from the tie leaf in a plane substantially normal to the windshield surface.

2. A wiper blade having an elongated body formed with a lengthwise chamber and provided with a longitudinal wiping edge, and a backing frame arranged in the chamber and comprising spaced longitudinal strips flexible toward the wiping edge and having an interposed cushioning member therebetween to provide a resilient backing for the wiping edge, said frame being flexible toward and from the surface being wiped and said strips cooperating with said cushioning member to resist torsional stresses when in operation.

3. A wiper blade for curved windshields, comprising an elongated rubber body having a wiping edge extending lengthwise thereof, a flat spring of undulatory shape embedded in the rubber body, a tie member connecting the crest portions at one side of the spring into a truss-like frame, and arm attaching means connected to the spring intermediate its length, the opposite end portions of the spring being shaped substantially to the curvature of the windshield.

4. A wiper blade having an elongated body provided with a wiping edge and a chamber substantially coextensive with the wiping edge, and a spring frame inserted in the chamber for flexing toward and from the wiping edge to conform the latter to the surface being wiped, said frame being in the form of a flat spring of serpentine shape and a longitudinal tie member fixed to the bends in the flat spring at one side of the serpentine shape.

5. A wiper blade having an elongated body provided with a wiping edge and a chamber substantially coextensive with the wiping edge, and a spring frame inserted in the chamber for flexing toward and from the wiping edge to conform the latter to the surface being wiped, said frame having a spring strip extending back and forth in undulatory fashion to provide a series of crest portions along one side thereof, and a tie member connected to such crest portions at one side of the strip.

6. A wiper blade having an elongated body provided with a wiping edge and a chamber substantially coextensive with the wiping edge, and a spring frame inserted in the chamber for flexing toward and from the wiping edge to conform the latter to the surface being wiped, said frame having a spring strip extending back and forth to provide undulations, a tie member connected to the undulations at one side of the strip, and a bearing member arranged at the opposite side of said strip for giving sliding support to the undulations therealong.

7. A wiper blade comprising an elongated body provided with a wiping edge extending lengthwise thereof, and a backing frame for the wiping edge having a spring leaf substantially coextensive with the wiping edge, and a second spring leaf secured at intervals to the first spring leaf with the portions intermediate such points of securement being shaped to form return bends, the side portions of the bends extending toward and from the wiping edge to give resilient support thereto.

8. A wiper blade comprising an elongated body provided with a wiping edge extending lengthwise thereof, and a backing frame for the wiping edge having a non-extensible tie strip flexible toward the latter and substantially coextensive with the wiping edge, a spring leaf secured at intervals to the tie strip with the portions intermediate such points of securement extending toward and from the wiping edge to provide a resilient support therefor.

ANTHONY C. SCINTA.

REFERENCES CITED

The following references are of record in the file of this patent:

FOREIGN PATENTS

| Number | Country | Date |
|---|---|---|
| 427,283 | Great Britain | Apr. 23, 1935 |
| 820,156 | France | July 26, 1947 |